(12) United States Patent
Gelmetti (10) Patent No.: US 8,882,018 B2
(45) Date of Patent: Nov. 11, 2014

(54) RETAINER FOR WELDING WIRE CONTAINER AND WELDING WIRE CONTAINER WITH RETAINER

(75) Inventor: Carlo Gelmetti, Lazise (IT)

(73) Assignee: Sidergas SpA (IT)

( * ) Notice: Subject to any disclaimer, the term of this patent is extended or adjusted under 35 U.S.C. 154(b) by 298 days.

(21) Appl. No.: 13/330,314

(22) Filed: Dec. 19, 2011

(65) Prior Publication Data
US 2013/0153705 A1 Jun. 20, 2013

(51) Int. Cl.
*B65H 59/06* (2006.01)

(52) U.S. Cl.
USPC ............... 242/423.1; 242/128; 242/156.1

(58) Field of Classification Search
USPC ........ 242/156, 156.1, 156.2, 423.1, 566, 593, 242/128, 125.3, 172, 419, 157 R
See application file for complete search history.

(56) References Cited

U.S. PATENT DOCUMENTS

| | | |
|---|---|---|
| 318,062 A | 5/1885 | Warren |
| 532,565 A | 1/1895 | Kilmer |
| 617,353 A | 1/1899 | Redmond |
| 627,722 A | 6/1899 | Edwards |
| 932,808 A | 8/1909 | Pelton |
| 1,276,117 A | 8/1918 | Riebe ............................ 464/171 |
| 1,468,994 A | 9/1923 | Cook ............................. 206/393 |
| 1,508,689 A | 9/1924 | Glasser ..................... 219/124.03 |
| 1,640,368 A | 8/1927 | Obetz et al. |
| 1,821,354 A | 9/1931 | Meyer ........................... 242/159 |
| 1,907,051 A | 5/1933 | Emery |
| 2,027,670 A | 1/1936 | Broeren ........................... 312/62 |
| 2,027,674 A | 1/1936 | Broeren ........................... 312/60 |
| 2,059,462 A | 11/1936 | Jungmann |
| 2,329,369 A | 9/1943 | Haver ............................. 285/11 |
| 2,366,101 A * | 12/1944 | Grothey ...................... 66/125 R |
| 2,407,746 A | 9/1946 | Johnson |
| 2,457,910 A | 1/1949 | McLaren et al. ................ 74/501 |
| 2,477,059 A | 7/1949 | Hill ............................. 242/137.1 |
| 2,483,760 A | 10/1949 | Duncan ........................ 254/190 |

(Continued)

FOREIGN PATENT DOCUMENTS

| | | | |
|---|---|---|---|
| CN | 1466469 | 1/2004 | ............. A61L 15/60 |
| CN | 1626423 | 6/2005 | |

(Continued)

OTHER PUBLICATIONS

Search Report received in Applicant's counterpart European Patent Application Serial No. 08017572.2-2302.

(Continued)

*Primary Examiner* — Emmanuel M Marcelo
*Assistant Examiner* — Justin Stefanon
(74) *Attorney, Agent, or Firm* — Hayes Soloway P.C.

(57) ABSTRACT

A retainer for controlling the payout of wire from a wire container is described. The retainer has at least three segments. Each segment is connected to the adjacent segment so as to allow a relative movement of adjacent segments with respect to each other. The entirety of the segments form a contact surface adapted for contacting the wire contained in the wire container. Further, a wire container is described having a reception space for a wire coil, a wire coil arranged in the reception space, with the wire forming an annular end face of the wire coil from which the wire is withdrawn from the wire container, and a retainer for controlling the payout of wire from a wire container.

23 Claims, 10 Drawing Sheets

(56) References Cited

U.S. PATENT DOCUMENTS

| | | | | |
|---|---|---|---|---|
| 2,579,131 A | 12/1951 | Tinsley | | 206/409 |
| 2,580,900 A | 1/1952 | Epstein | | 206/409 |
| 2,679,571 A | 5/1954 | Chappel | | 219/137.44 |
| 2,694,130 A | 11/1954 | Howard | | 219/8 |
| 2,713,938 A | 7/1955 | Snyder | | 206/395 |
| 2,724,538 A | 11/1955 | Schweich | | |
| 2,752,108 A * | 6/1956 | Richardson | | 242/128 |
| 2,838,922 A * | 6/1958 | Gift | | 66/125 R |
| 2,849,195 A | 8/1958 | Richardson | | |
| 2,864,565 A | 12/1958 | Whearley | | |
| 2,869,719 A | 1/1959 | Hubbard | | |
| 2,880,305 A | 3/1959 | Baird | | |
| 2,911,166 A | 11/1959 | Haugwitz | | 242/128 |
| 2,929,576 A | 3/1960 | Henning | | |
| 2,966,258 A | 12/1960 | Krafft | | |
| 2,974,850 A * | 3/1961 | Mayer | | 206/409 |
| 2,984,596 A | 5/1961 | Franer | | 206/412 |
| 3,022,415 A | 2/1962 | Francois | | 219/137.44 |
| 3,096,951 A | 7/1963 | Jenson | | 242/137.1 |
| 3,108,180 A | 10/1963 | Linnander | | 219/137.44 |
| 3,119,042 A | 1/1964 | Bond | | |
| 3,185,185 A | 5/1965 | Pfund | | |
| 3,244,347 A | 4/1966 | Jenk | | |
| 3,274,850 A | 9/1966 | Tascio | | 74/501 |
| 3,283,121 A | 11/1966 | Bernard et al. | | 219/137.44 |
| 3,284,608 A | 11/1966 | McDonald | | 219/137.43 |
| 3,344,682 A | 10/1967 | Bratz | | 74/501 |
| 3,352,412 A | 11/1967 | Draving et al. | | 242/170 |
| 3,433,504 A | 3/1969 | Hanes | | 285/93 |
| 3,463,416 A | 8/1969 | Quenot | | 242/396.9 |
| 3,478,435 A | 11/1969 | Cook | | |
| 3,491,876 A | 1/1970 | Zecchin | | 206/395 |
| 3,512,635 A | 5/1970 | Lang | | |
| 3,536,888 A | 10/1970 | Borneman | | 219/137.43 |
| 3,565,129 A | 2/1971 | Field | | |
| 3,567,900 A | 3/1971 | Nelson | | |
| 3,576,966 A | 5/1971 | Sullivan | | |
| 3,595,277 A | 7/1971 | Lefever | | |
| 3,648,920 A | 3/1972 | Stump | | 229/199 |
| 3,690,567 A | 9/1972 | Borneman | | 239/591 |
| 3,724,249 A | 4/1973 | Asbeck et al. | | |
| 3,729,092 A | 4/1973 | Marcell | | |
| 3,730,136 A | 5/1973 | Okada | | 118/78 |
| 3,799,215 A | 3/1974 | Willems | | |
| 3,815,842 A | 6/1974 | Scrogin | | 242/423.1 |
| 3,823,894 A | 7/1974 | Frederick et al. | | 242/137.1 |
| 3,939,978 A | 2/1976 | Thomaswick | | 206/454 |
| 4,000,797 A | 1/1977 | Ducanis | | 193/38 |
| 4,043,331 A | 8/1977 | Martin et al. | | 128/156 |
| 4,044,583 A | 8/1977 | Kinney, Jr. | | |
| 4,074,105 A | 2/1978 | Minehisa et al. | | |
| 4,097,004 A | 6/1978 | Reese | | 242/129 |
| 4,102,483 A | 7/1978 | Ueyama et al. | | |
| 4,113,795 A | 9/1978 | Izawa et al. | | 524/84 |
| 4,127,590 A | 11/1978 | Endo et al. | | 260/346.74 |
| 4,157,436 A | 6/1979 | Endo et al. | | 528/167 |
| 4,161,248 A * | 7/1979 | Kalmanovitch | | 206/389 |
| 4,171,783 A * | 10/1979 | Waltemath | | 242/128 |
| 4,172,375 A | 10/1979 | Rushforth et al. | | |
| 4,188,526 A | 2/1980 | Asano | | |
| 4,222,535 A | 9/1980 | Hosbein | | 242/128 |
| 4,254,322 A | 3/1981 | Asano | | |
| 4,274,607 A | 6/1981 | Priest | | 242/163 |
| 4,280,951 A | 7/1981 | Saito et al. | | 524/118 |
| 4,293,103 A | 10/1981 | Tsukamoto | | |
| 4,354,487 A | 10/1982 | Oczkowski et al. | | 604/366 |
| 4,392,606 A | 7/1983 | Fremion | | 206/600 |
| 4,396,797 A | 8/1983 | Sakuragi et al. | | 174/68 |
| 4,429,001 A | 1/1984 | Kolpin et al. | | 442/340 |
| 4,451,014 A | 5/1984 | Kitt et al. | | 242/128 |
| 4,464,919 A | 8/1984 | Labbe | | |
| 4,500,315 A | 2/1985 | Pieniak et al. | | 604/379 |
| 4,540,225 A | 9/1985 | Johnson et al. | | 439/192 |
| 4,546,631 A | 10/1985 | Eisinger | | |
| 4,575,612 A | 3/1986 | Prunier | | 219/137.43 |
| 4,582,198 A | 4/1986 | Ditton | | |
| 4,585,487 A | 4/1986 | Destree et al. | | |
| 4,623,063 A | 11/1986 | Balkin | | |
| 4,737,567 A | 4/1988 | Matsumoto et al. | | 528/167 |
| 4,742,088 A | 5/1988 | Kim | | 521/118 |
| 4,826,497 A | 5/1989 | Marcus et al. | | 604/359 |
| 4,855,179 A | 8/1989 | Bourland et al. | | 442/409 |
| 4,869,367 A * | 9/1989 | Kawasaki et al. | | 206/409 |
| 4,891,493 A | 1/1990 | Sato et al. | | |
| 4,916,282 A | 4/1990 | Chamming et al. | | 219/69.2 |
| 4,918,286 A | 4/1990 | Boyer | | 219/137.44 |
| 4,949,567 A | 8/1990 | Corbin | | |
| 4,974,789 A | 12/1990 | Milburn | | 242/159 |
| 5,051,539 A | 9/1991 | Leathers-Wiessner | | |
| 5,061,259 A | 10/1991 | Goldman et al. | | 604/368 |
| 5,078,269 A | 1/1992 | Dekko et al. | | |
| 5,100,397 A | 3/1992 | Poccia et al. | | 604/365 |
| 5,105,943 A | 4/1992 | Lesko et al. | | |
| 5,109,983 A | 5/1992 | Malone et al. | | 206/408 |
| 5,147,646 A | 9/1992 | Graham | | 424/424 |
| 5,165,217 A | 11/1992 | Sobel et al. | | 242/159 |
| 5,201,419 A | 4/1993 | Hayes | | 206/409 |
| 5,205,412 A | 4/1993 | Krieg | | |
| 5,215,338 A | 6/1993 | Kimura et al. | | 285/166 |
| 5,227,314 A | 7/1993 | Brown et al. | | |
| 5,261,625 A * | 11/1993 | Lanoue | | 242/129.8 |
| 5,277,314 A | 1/1994 | Cooper et al. | | 206/398 |
| 5,314,111 A | 5/1994 | Takaku et al. | | |
| 5,368,245 A | 11/1994 | Fore | | 242/171 |
| 5,372,269 A | 12/1994 | Sutton et al. | | |
| 5,452,841 A | 9/1995 | Sibata et al. | | |
| 5,485,968 A | 1/1996 | Fujioka | | 242/172 |
| 5,494,160 A | 2/1996 | Gelmetti | | |
| 5,530,088 A | 6/1996 | Sheen et al. | | 528/287 |
| 5,553,810 A | 9/1996 | Bobeczko | | 206/409 |
| 5,562,646 A | 10/1996 | Goldman et al. | | 604/368 |
| 5,585,013 A | 12/1996 | Truty | | 219/69.12 |
| 5,586,733 A | 12/1996 | Miura et al. | | 242/125.2 |
| 5,590,848 A | 1/1997 | Shore et al. | | |
| 5,629,377 A | 5/1997 | Burgert et al. | | 524/832 |
| 5,665,801 A | 9/1997 | Chang et al. | | 524/125 |
| 5,692,700 A | 12/1997 | Bobeczko | | |
| 5,714,156 A | 2/1998 | Schmidt et al. | | 424/404 |
| 5,738,209 A | 4/1998 | Burr et al. | | 206/397 |
| 5,739,704 A | 4/1998 | Clark | | |
| 5,746,380 A | 5/1998 | Chung | | 242/171 |
| 5,758,834 A * | 6/1998 | Dragoo et al. | | 242/128 |
| 5,778,939 A | 7/1998 | Hok-Yin | | 138/120 |
| 5,816,466 A | 10/1998 | Seufer | | |
| 5,819,934 A | 10/1998 | Cooper | | |
| 5,845,862 A * | 12/1998 | Cipriani | | 242/423.1 |
| 5,847,184 A | 12/1998 | Kleiner | | 558/73 |
| 5,865,051 A | 2/1999 | Otzen et al. | | |
| 5,921,391 A | 7/1999 | Ortiz et al. | | 206/397 |
| 5,931,408 A | 8/1999 | Ishii et al. | | 242/580 |
| 5,971,308 A | 10/1999 | Boulton | | |
| 5,988,370 A | 11/1999 | Roemer et al. | | 206/215 |
| 5,990,377 A | 11/1999 | Chen et al. | | 604/381 |
| 6,016,911 A | 1/2000 | Chen | | 200/395 |
| 6,019,303 A | 2/2000 | Cooper | | |
| 6,103,358 A | 8/2000 | Bruggermann et al. | | 428/317.9 |
| 6,159,591 A | 12/2000 | Beihoffer et al. | | 428/327 |
| 6,237,768 B1 | 5/2001 | Cipriani | | |
| 6,245,880 B1 | 6/2001 | Takeuchi et al. | | 528/287 |
| 6,255,371 B1 | 7/2001 | Schlosser et al. | | 524/100 |
| 6,260,781 B1 | 7/2001 | Cooper | | |
| 6,301,944 B1 | 10/2001 | Offer | | |
| 6,322,016 B1 | 11/2001 | Jacobsson et al. | | |
| 6,340,522 B1 | 1/2002 | Burke et al. | | |
| 6,408,888 B1 | 6/2002 | Baeumer et al. | | 138/120 |
| 6,409,116 B1 * | 6/2002 | Brown | | 242/419.1 |
| 6,417,425 B1 | 7/2002 | Whitmore et al. | | 604/367 |
| 6,425,549 B1 | 7/2002 | Bae et al. | | 242/580 |
| 6,464,077 B1 | 10/2002 | Liu | | 206/388 |
| 6,481,892 B1 | 11/2002 | Agostini | | 384/43 |
| 6,498,227 B1 | 12/2002 | Horie | | 528/176 |
| 6,524,010 B1 | 2/2003 | Derman | | 384/513 |
| 6,547,176 B1 * | 4/2003 | Blain et al. | | 242/423.1 |
| 6,564,943 B2 | 5/2003 | Barton et al. | | 206/395 |

(56) References Cited

U.S. PATENT DOCUMENTS

| | | | |
|---|---|---|---|
| 6,613,848 B1 | 9/2003 | Wang et al. .................. 525/481 |
| 6,636,776 B1 | 10/2003 | Barton et al. |
| 6,648,141 B2 * | 11/2003 | Land ............................ 206/408 |
| 6,649,870 B1 | 11/2003 | Barton et al. |
| 6,708,864 B2 | 3/2004 | Ferguson, III et al. |
| 6,715,608 B1 | 4/2004 | Moore ........................ 206/397 |
| 6,745,899 B1 * | 6/2004 | Barton ........................ 206/409 |
| 6,749,139 B2 | 6/2004 | Speck |
| 6,750,262 B1 | 6/2004 | Hahnle et al. .................. 521/64 |
| 6,753,454 B1 | 6/2004 | Smith et al. .................... 602/41 |
| 6,821,454 B2 | 11/2004 | Visca et al. |
| 6,831,142 B2 | 12/2004 | Mertens et al. ............ 526/328.5 |
| 6,872,275 B2 | 3/2005 | Ko et al. ....................... 156/181 |
| 6,889,835 B2 | 5/2005 | Land ............................ 206/408 |
| 6,913,145 B2 * | 7/2005 | Barton et al. ................. 206/409 |
| 6,938,767 B2 | 9/2005 | Gelmetti ...................... 206/408 |
| 6,977,357 B2 | 12/2005 | Hsu et al. |
| 7,004,318 B2 * | 2/2006 | Barton ........................ 206/409 |
| 7,108,916 B2 | 9/2006 | Ehrnsperger et al. ......... 428/403 |
| 7,147,176 B2 | 12/2006 | Rexhaj |
| 7,152,735 B2 | 12/2006 | Dragoo et al. ............... 206/408 |
| 7,156,334 B1 | 1/2007 | Fore et al. .................... 242/171 |
| 7,178,755 B2 * | 2/2007 | Hsu et al. ................... 242/423.1 |
| 7,198,152 B2 * | 4/2007 | Barton et al. ................. 206/409 |
| 7,220,942 B2 | 5/2007 | Barton et al. |
| 7,309,038 B2 * | 12/2007 | Carroscia ..................... 242/170 |
| 7,377,388 B2 | 5/2008 | Hsu et al. ..................... 206/389 |
| RE40,351 E * | 6/2008 | Cipriani .................... 242/423.1 |
| 7,398,881 B2 * | 7/2008 | Barton et al. ................. 206/408 |
| 7,410,111 B2 * | 8/2008 | Carroscia ..................... 242/171 |
| 7,441,657 B2 | 10/2008 | Gelmetti ...................... 206/393 |
| 7,441,721 B2 * | 10/2008 | Bae et al. ..................... 242/128 |
| 7,533,906 B2 | 5/2009 | Luettgen et al. ........... 285/146.1 |
| 7,563,840 B2 | 7/2009 | Ye ................................ 524/449 |
| 7,748,530 B2 | 7/2010 | Hsu et al. ..................... 206/408 |
| 7,950,523 B2 * | 5/2011 | Gelmetti ...................... 206/408 |
| 8,207,475 B2 | 6/2012 | Minato et al. ............ 219/137.31 |
| 8,235,210 B2 | 8/2012 | De Lacerda et al. ......... 206/393 |
| 2001/0014706 A1 | 8/2001 | Sprenger et al. ............. 523/400 |
| 2002/0000391 A1 | 1/2002 | Kawasai et al. .............. 206/408 |
| 2002/0003014 A1 | 1/2002 | Homma |
| 2002/0014477 A1 | 2/2002 | Lee et al. |
| 2002/0039869 A1 | 4/2002 | Achille ........................ 442/417 |
| 2002/0120178 A1 | 8/2002 | Tartaglia et al. .............. 600/114 |
| 2003/0042162 A1 | 3/2003 | Land ............................ 206/408 |
| 2003/0042163 A1 | 3/2003 | Cipriani |
| 2003/0052030 A1 | 3/2003 | Gelmetti ...................... 206/397 |
| 2003/0184086 A1 | 10/2003 | Christianson .............. 285/146.1 |
| 2004/0020041 A1 | 2/2004 | Ferguson, III et al. |
| 2004/0050441 A1 | 3/2004 | Roschi ......................... 138/120 |
| 2004/0133176 A1 | 7/2004 | Muthiah et al. .............. 604/368 |
| 2004/0155090 A1 | 8/2004 | Jensen ......................... 206/408 |
| 2004/0176557 A1 | 9/2004 | Mertens et al. ............ 526/328.5 |
| 2004/0186244 A1 | 9/2004 | Hatsuda et al. .............. 525/451 |
| 2004/0201117 A1 | 10/2004 | Anderson ..................... 264/4.3 |
| 2004/0241333 A1 | 12/2004 | Cielenski et al. ........... 427/421.1 |
| 2004/0265387 A1 | 12/2004 | Hermeling et al. .......... 424/486 |
| 2005/0008776 A1 | 1/2005 | Chhabra et al. .............. 427/180 |
| 2005/0261461 A1 | 11/2005 | Maeda et al. ................. 528/272 |
| 2006/0027699 A1 | 2/2006 | Bae et al. |
| 2006/0074154 A1 | 4/2006 | Harashina et al. ............ 524/115 |
| 2006/0155254 A1 | 7/2006 | Sanz et al. .................... 604/378 |
| 2006/0247343 A1 | 11/2006 | Kishimoto et al. ........... 524/117 |
| 2006/0258824 A1 | 11/2006 | Oshima et al. ............... 525/533 |
| 2006/0278747 A1 | 12/2006 | Carroscia |
| 2007/0175786 A1 | 8/2007 | Nicklas |
| 2007/0272573 A1 | 11/2007 | Gelmetti |
| 2007/0284354 A1 | 12/2007 | Laymon ................... 219/137.51 |
| 2008/0156925 A1 | 7/2008 | Cooper ...................... 242/559.3 |
| 2008/0257875 A1 | 10/2008 | De Keizer ................ 219/137.44 |
| 2008/0300349 A1 | 12/2008 | Fuchikami et al. ........... 524/117 |
| 2008/0314876 A1 | 12/2008 | Pinsonneault et al. ......... 219/74 |
| 2009/0014572 A1 | 1/2009 | Weissbrod et al. |
| 2009/0014579 A1 | 1/2009 | Bender et al. |
| 2009/0200284 A1 | 8/2009 | Sanchez ................... 219/137.51 |
| 2010/0116803 A1 | 5/2010 | Gelmetti ...................... 219/138 |
| 2011/0073703 A1 | 3/2011 | Gelmetti et al. ............ 242/615.2 |
| 2011/0094911 A1 | 4/2011 | Gelmetti ...................... 206/408 |
| 2011/0114523 A1 | 5/2011 | Gelmetti ...................... 206/407 |
| 2011/0114617 A1 | 5/2011 | Gelmetti et al. ............ 219/137.9 |
| 2011/0132880 A1 | 6/2011 | Kossowan ................. 219/76.14 |
| 2013/0193259 A1 * | 8/2013 | Weissbrod et al. ........... 242/566 |

FOREIGN PATENT DOCUMENTS

| | | | |
|---|---|---|---|
| DE | 1011840 B | 7/1957 | |
| DE | 1082215 | 11/1957 | |
| DE | 1 154 624 | 9/1963 | |
| DE | 2122958 | 11/1972 | |
| DE | 2 148 348 | 4/1973 | .............. D01F 7/04 |
| DE | 2202177 | 7/1973 | |
| DE | 2525938 | 12/1976 | .............. B23K 9/18 |
| DE | 26 46 218 | 4/1977 | .............. C07F 9/32 |
| DE | 28 16 100 | 10/1978 | .............. C08G 63/68 |
| DE | 36 09 839 | 10/1989 | .............. F16L 57/00 |
| DE | 19909214 | 3/1999 | .............. C08J 9/20 |
| DE | 199 10 128 | 1/2001 | .............. A61B 1/008 |
| DE | 19958697 | 6/2001 | .............. B01J 20/00 |
| DE | 100 06 592 | 8/2001 | .............. C08G 59/18 |
| DE | 10292831 | 1/2002 | .............. B01J 13/00 |
| DE | 103 60 466 | 7/2005 | |
| DE | 102007015946 | 2/2008 | .............. B23K 9/133 |
| DE | 202011104120 | 1/2012 | .............. B23K 9/133 |
| EP | 2 267 255 | 4/1974 | |
| EP | 0408259 | 4/1992 | |
| EP | 0519424 A1 | 12/1992 | |
| EP | 2 264 482 | 9/1993 | |
| EP | 584056 | 2/1994 | |
| EP | 0665 166 | 1/1995 | |
| EP | 0686439 A1 | 12/1995 | |
| EP | 0806429 | 11/1997 | .............. C07F 9/655 |
| EP | 1 057 751 | 12/2000 | |
| EP | 1 070 754 | 1/2001 | .............. C09K 21/10 |
| EP | 1 275 595 | 1/2003 | |
| EP | 1 295 813 | 3/2003 | .............. B65D 85/04 |
| EP | 1 471 024 | 10/2004 | |
| EP | 1 698 421 | 6/2006 | |
| EP | 1 974 846 | 10/2008 | .............. B23K 9/133 |
| EP | 1974846 | 10/2008 | .............. B23K 9/133 |
| EP | 2 256 064 | 1/2010 | |
| EP | 2 354 039 | 1/2010 | .............. B65D 85/04 |
| EP | 2 168 706 | 3/2010 | .............. B23K 9/133 |
| EP | 2 286 950 | 2/2011 | |
| EP | 2695696 | 2/2014 | .............. B23K 9/12 |
| FR | 1215111 | 4/1960 | |
| FR | 2055181 | 5/1971 | |
| FR | 2595674 | 3/1988 | |
| FR | 2 888 825 | 1/2007 | .............. B65H 57/14 |
| GB | 880502 | 10/1961 | |
| GB | 1168928 | 10/1969 | |
| GB | 1229913 | 4/1971 | |
| GB | 1 575 157 | 9/1980 | .............. C09K 21/12 |
| GB | 2059462 | 4/1981 | |
| GB | 2 332 451 | 6/1999 | |
| JP | 49-13065 | 2/1974 | |
| JP | 54-035842 | 3/1979 | |
| JP | 54-043856 | 4/1979 | |
| JP | 55-054295 | 4/1980 | |
| JP | 55-156694 | 12/1980 | |
| JP | 56-023376 | 3/1981 | |
| JP | 57-102471 | 6/1982 | |
| JP | 58-035068 | 3/1983 | |
| JP | 58-70384 | 5/1983 | |
| JP | 59-197386 | 11/1984 | |
| JP | 59-229287 | 12/1984 | |
| JP | 59-732669 | 12/1984 | |
| JP | 60-021181 | 2/1985 | |
| JP | 60-032281 | 2/1985 | |
| JP | 60-082275 | 5/1985 | |
| JP | 60-082276 | 5/1985 | |
| JP | 60-184422 | 9/1985 | |
| JP | 60-223664 | 11/1985 | |
| JP | 61-162541 A | 7/1986 | |
| JP | 61-293674 | 12/1986 | |

(56) References Cited

FOREIGN PATENT DOCUMENTS

| | | | | |
|---|---|---|---|---|
| JP | 62-009774 | | 1/1987 | |
| JP | 62-111872 | | 5/1987 | |
| JP | 62-287055 | | 12/1987 | |
| JP | 63-147781 | | 6/1988 | |
| JP | 1-65265 | | 4/1989 | |
| JP | 1-240222 | | 9/1989 | |
| JP | 3-264169 | | 11/1991 | |
| JP | 03264169 | A | 11/1991 | |
| JP | 4-112169 | | 4/1992 | |
| JP | 04-133973 | * | 5/1992 | ............ B65H 59/06 |
| JP | 4-274875 | | 9/1992 | |
| JP | 5-178538 | | 7/1993 | |
| JP | 7-247058 | | 9/1995 | |
| JP | 8-40642 | | 2/1996 | |
| JP | 08-150492 | | 6/1996 | |
| JP | 08-267274 | | 10/1996 | |
| JP | 2000-202630 | | 7/2000 | |
| JP | 2000-225468 | | 8/2000 | |
| JP | 2000-263239 | | 9/2000 | |
| JP | 2001-26375 | | 1/2001 | ............ B65H 75/16 |
| JP | 2001-150187 | | 6/2001 | |
| JP | 2001-323268 | A | 11/2001 | |
| JP | KR 2002-0077857 | | 10/2002 | |
| JP | 2004-025242 | | 1/2004 | |
| JP | 2004-025243 | | 1/2004 | |
| JP | 2004025220 | A * | 1/2004 | ............ B23K 9/133 |
| JP | 2005-169499 | | 6/2005 | |
| JP | 2007-927 | | 1/2007 | |
| JP | 2007-29971 | | 2/2007 | |
| KR | 20040059894 | A * | 12/2002 | ............ B23K 9/133 |
| KR | 1020040059891 | * | 7/2004 | ............ B23K 9/133 |
| SU | 793678 | | 1/1981 | |
| SU | 1412830 | | 7/1988 | |
| WO | WO 81/03319 | | 11/1981 | |
| WO | WO 88/10230 | | 12/1988 | |
| WO | WO 94-00493 | | 1/1994 | |
| WO | WO 94/19258 | | 9/1994 | |
| WO | WO 97/00878 | | 1/1997 | ............ C07F 9/6571 |
| WO | WO 98/52844 | | 11/1998 | |
| WO | WO 00-50197 | | 8/2000 | |
| WO | WO 01/27365 | | 4/2001 | ............ D01H 4/28 |
| WO | WO 02/094493 | | 11/2002 | |
| WO | WO 03/106096 | | 12/2003 | ............ B23K 9/133 |
| WO | WO 2005/005704 | | 1/2005 | ............ D04H 13/02 |
| WO | WO 2005/061168 | | 7/2005 | |
| WO | 2006091075 | | 8/2006 | ............ B23K 9/133 |
| WO | WO 2007/010171 | | 1/2007 | ............ B65H 57/00 |
| WO | WO 2007/112972 | | 10/2007 | ............ B23K 9/133 |
| WO | WO 2007/149689 | | 12/2007 | |
| WO | WO 2009/007845 | | 1/2009 | |
| WO | WO 2009/143917 | | 12/2009 | ............ B65H 57/14 |
| WO | WO 2011/147565 | | 12/2011 | ............ B23K 9/133 |
| WO | WO 2013/092658 | | 6/2013 | ............ B65H 57/18 |

OTHER PUBLICATIONS

Search Report received in Applicant's counterpart European Patent Application Serial No. 10014216.5-1256 (8 pages), dated Apr. 14, 2011.
Search Report received in Applicant's counterpart European Patent Application Serial No. 11000892.7-2302 (8 pages), dated Jul. 19, 2011.
Search Report received in Applicant's counterpart European Patent Application Serial No. 11000236.7 (8 pages), dated Aug. 4, 2011.
Italian Search Report issued in related application No. MI20121423, dated Apr. 29, 2013 (2 pgs).
Office Action issued in related U.S. Appl. No. 13/382,491, dated Jul. 11, 2013 (15 pgs).
U.S. Office Action issued in related U.S. Appl. No. 12/572,994, dated Sep. 17, 2013 (13 pgs).
Notice of Allowance dated Mar. 18, 2013 issued in U.S. Appl. No. 12/994,686 (10 pgs).
Office Action issued in related U.S. Appl. No. 12/572,994, dated Apr. 24, 2013 (22 pgs).
Extended European Search Report issued in related application No. 13179908.2, dated Nov. 13, 2013 (6 pgs).
"International Plastics Flammability Handbook" Jurgen Troitzsch, $2^{nd}$ edition, 1990, pp. 33, 43-49 and 59.
Chinese Official Action dated Mar. 17, 2010.
EPO Office Action issued for related application No. 09753572.8, dated May 2, 2012 (5 pgs).
European Office Action for corresponding application No. 10 014 553.1-2302, dated Apr. 3, 2012 (4 pgs).
European Office Action issued for 09777298.2, dated Aug. 31, 2012 (4 pgs).
European Search Report, dated Mar. 2, 2011 (7 pgs).
European Search Report, dated Sep. 17, 2008.
Hansen et al., "Water Absorption and Mechanical Properties of Electrospun Structured Hydrogels", Journal of Applied Polymer Science, vol. 95, pp. 427-434 (2005).
International Preliminary Report on Patentability issued for related application No. PCT/EP2009/001285, dated Nov. 30, 2010 (7 pgs).
International Preliminary Report on Patentability, dated Sep. 16, 2010 (5 pgs).
International Preliminary Report, PCT/IPEA/409, 7 pages, Jul. 3, 2008.
International Search Report and Written Opinion issued in corresponding PCT Appln. No. PCT/EP2009/005246, dated Apr. 6, 2010 (9 pgs).
International Search Report issued in Applicants' underlying PCT Application Serial No. PCT/EP09/001285, dated Feb. 24, 2009 (3 pgs).
International Search Report, dated Jul. 6, 2009 (3 pgs).
Korean Official Action dated May 16, 2011, Appln. No. 2008-7005433, (3 pgs).
Office Action issued for related U.S. Appl. No. 12/618,250, dated Apr. 26, 2012 (11 pgs).
PCT International Search Report, dated Nov. 6, 2008.
Plaza et al., Preparation of ethylenebis(nitrilodimethylene)tetrakis(phenylphosphinic acid), Inorganic Synthesis, vol. 16, No. 199, abstract, one page, Jan. 5, 2007.
Ullmanns Encyclopedia of Industrial Chemistry, Sulfuric Acid & Sulfur Trioxide to Tetrahydrofuran, Superabsorbents, $6^{th}$ Edition, vol. 35, pp. 73, 80, 86 and 89 (2003.
US Official Action dated Feb. 13, 2012, issued in U.S. Appl. No. 12/917,320 (14 pgs).
US Official Action dated Dec. 14, 2012, issued in U.S. Appl. No. 12/994,686 (17 pgs).
US Official Action dated Mar. 5, 2013, issued in U.S. Appl. No. 13/382,491 (33 pgs).
Notice of Allowance dated Mar. 5, 2013 issued in U.S. Appl. No. 12/593,271 (15 pgs).

* cited by examiner

RETAINER FOR WELDING WIRE CONTAINER AND WELDING WIRE CONTAINER WITH RETAINER

The invention relates to a retainer for controlling the payout of wire from a wire container, in particular of welding wire from a welding wire container. The invention further relates to a wire container comprising such retainer.

BACKGROUND OF THE INVENTION

Welding wire is often supplied in the form of a coil contained in a container, the central axis of the coil being arranged vertically. The welding wire is withdrawn from the container by pulling the welding wire upwardly through a central opening of the container. Typically, a retainer is used which is placed on top of the coil and which prevents that the upper turns of the welding wire change their position in an uncontrolled manner such that tangles and knots could occur in the welding wire.

Automated welding and other industrial applications often require large quantities of wires to be stored in these containers, also referred to as bulk containers (drums or boxes with polygonal cross-section) with the scope of minimizing the production interruptions caused by pack changeovers. These bulk packs can, in some instances, carry up to 1,400 kg (approx. 3,000 lbs) of wire, and the wire can have diameters of up to 4.00 mm (5/32"). Since their introduction years ago, these bulk packages containing large quantities of twist-free torsion-less wires have become increasingly popular in many applications that exploit the benefits of robotic and automation in welding processes like GMAW (Gas Metal Arc welding) and SAW (Submerged Arc Welding) or have found their use in the metal spraying of wires for surface treatments and several other industrial applications.

Employing packs with larger dimensions in order to accommodate larger diameter wires involves however also the necessity to overcome a few technical problems like the difficulty to effectively maintain all the wire strands in control while a single wire is being paid out from the pack, and prevent them from exiting the packs simultaneously and uncontrolled with consequent tangles and unwanted production stops which would offset the downtime savings achieved by bulk quantities in the pack. Weld bead interruptions caused by poor feeding or tangled wires can, in some cases, negatively affect the mechanical properties of the finished welded parts rendering them unfit for sale with considerable economic damages for the manufacturer. As previously explained, tangling can occur when a few wire strands are not properly grasped by the retainer and they can freely fall into the center of the drum or pack from where they feed in an uncontrolled and disorderly manner.

It is obvious that the larger the inner diameter of the drums or containers, the more and more difficult it is to control the strands of wire with the conventional retainers known so far.

Bulk pack retainers are commonly employed today in the industry and they come in different forms ranging from ring shaped plane plates to cone shaped plates and metal cages but they all have in common the fact that they are rigid pieces. Consequently, especially with thicker and therefore stiffer wires which exert a lot of pressure upward, the wire being paid out from the pack can lift the one-piece rigid retainer and involuntarily cause the uncontrolled release of other wire strands which can freely escape from underneath the retainer itself, and jam.

Some of the prior art solutions like those shown in U.S. Pat. Nos. 5,746,380 or 7,004,318 attempt to provide a dynamic retainer which interacts with the payout of the wire. However, in order to function and for the retainer and the retaining elements not to be dragged or fall into the center of the drum or pack, they must rely on a centre core provided in the container, which represents itself a feeding obstacle for the wire, specially in the lower half of the drum/pack. More specifically, both solutions shown in these documents appear to be totally useless with thick wires which are characterized by a high "columnar" strength, since these retainers are not strong enough to keep the wire strands down and under control. If the retainer weight however is intentionally increased in an attempt to compensate the increased pressure strength of thicker wires, they end up deforming the single wire strand being paid out with a negative effect on the precision of the weld placement. Testing at Wind Tower manufacturing sites showed that softer Submerged Arc welding wire, like SAW UNI EN 756:04 grade S2 (AWS A5.17:07 grade EM12K) even in a 4.00 mm diameter can easily be bent and deformed by a rigid heavy retainer with consequent "wavy" defects and irregular weld beads, which are totally unacceptable for the quality and safety standards required by such application.

US 2011/0114523 shows a solution which, although it comes with benefit that a centre core is not required, proposes a self-adapting rubber retainer with multiple flexible stripes. However, manufacturing costs are an issue here since, in order to stay placed on the wire coil and not to slip into the centre of the drum/pack, it must be attached to a supportive outer rigid frame. The cost of molding or assembling two materials (one rigid and one flexible) for the same retainer would negatively impact the price of the wire contained in the pack. Moreover, the rigid outer supporting frame still makes the flexible retainer behave like a rigid one and such solution is technically impossible with packs having a diameter as large as 1,000 mm (3.28 ft).

US 2011/0094011 shows a rigid panel with four flexible rubber fingers at the corners. This solution also requires a composed retainer which is more expensive to produce but it is definitely unsuitable for controlling and braking of thicker wires ranging from 2.00 to 4.00 mm in diameter, as normally used in the SAW (Submerged Arc Welding) applications.

Accordingly, there is a need for a retainer which can be produced at low costs but at the same time allows to reliably prevent entanglement and unintentional lifting of the upper turns of the wire from the coil.

BRIEF DESCRIPTION OF THE INVENTION

The invention provides a retainer for controlling the payout of wire from a wire container. The retainer has at least three segments. Each segment is connected to the adjacent segment so as to allow a relative movement of adjacent segments with respect to each other. The entirety of the segments form a contact surface adapted for contacting the wire contained in the wire container. The invention is based on the idea of forming a retainer which, by means of its weight in total, reliably sits on top of the wire coil and prevents unintended displacement and/or entanglement of the wire turns on top of the coil. At the same time, the wire currently withdrawn must lift only the respective segment of the retainer (or the respective two adjacent segments) in order to be pulled from the upper surface of the coil, which does not require significant forces in view of the segments being moveable with respect to each other. Further, the retainer presents a simple and inexpensive but efficient solution, because the retainer is formed through the assembly of many segments or "tiles" which are being held together by a locking mechanism but are, at the same time, free to independently move upward to meet the pressure exerted by the passage of the payout wire and free to rapidly fall back onto the wire coil after the paying wire is no longer in contact with them. The movement which is thus generated is comparable to "The Wave" or "La Ola", namely a wave of spectators in a packed sport stadium which briefly stand and raise their arms, and then return to their usual seated position, thereby creating the visual effect of a wave traveling through the crowd.

By forming the retainer from a plurality of segments, a modular retainer plate is formed for dynamically controlling the wires strands contained in a bulk pack by partially engaging with the single strand of wire being paid out and at the same time self-adapting to the shape of the wire coil. Thanks to its particular configuration the retainer plate, while holding its segments or "tiles" connected to one another, still allows each individual segment (or two adjacent segments) to react independently to the force exerted by the passage of the wire being paid out and to be lifted upward, while the other segments of the retainer stay down in direct contact with the coil to better control the remaining wire strands and to prevent them from being inadvertently pulled and tangled.

Preferably, the segments are identical. This reduces the manufacturing costs as a single mold is sufficient for producing all the segments.

According to a preferred embodiment of the invention, each segment comprises a first connection section and a second connection section, the first and second connection sections being arranged at opposite ends of the segment, the first connection section of one of the segments being connected to the second connection section of an adjacent one of the segments. This allows joining the segments in a chain-like manner so as to form a closed ring.

Preferably, the first connection section and the second connection section mechanically engage into each other. Having the segments engage each other mechanically ensures that they are reliably connected to each other such that unintentional separation is prevented.

According to a preferred embodiment of the invention, the segments overlap each others, preferably with the second connection section being arranged on top of the first connection section. In this manner, it is ensured that the wire withdrawn from under the retainer cannot get caught in a gap between the segments but reliably slides from one segment onto the adjacent one.

Preferably, the first connection section comprises a projection and the second connection section comprises an opening into which the projection engages. This solution allows to achieve a strong connection between adjacent segments.

For reliably and quickly connecting the segments to each other, the projection can be formed as at least one latch.

Preferably, the segments of the retainer form a ring, the inner circumference of the ring comprising a shoulder which is arranged at a level which is different from a level defined by the contact surface. The shoulder provides an additional holding effect for the upper strands or turns of the wire coil, thereby preventing them from unintentionally falling into the center space of the coil.

In order to increase the retaining effect of the retainer on the wire of the wire coil, the contact surface comprises roughened portions.

According to an embodiment of the invention, at least one of the segments is provided with a weight element. The weight element increases the weight of the retainer, thereby increasing the retaining effect on the wire. This allows adapting the retainer to different wires. For thinner wires, a retainer is used which is formed from the segments only. For thicker wires, the retainer can be equipped with an appropriate number of weights of with weights having the appropriate mass.

Preferably, the weight element is formed from metal. Due to the high specific weight of metal, a significant mass can be obtained while still having a compact weight element.

According to an embodiment of the invention, the weight element is mechanically connected to the segment in order to prevent unintentional separation of the weight element from the segment which could result in the weight element falling into the center space of the coil where it possibly is an obstacle to smooth withdrawal of the wire.

The retainer preferably comprises a fixture for the weight element so that it can be attached to the segment easily.

Preferably, the fixture comprises at least one elastic latch for releasably attaching the weight element to the segment. Thereby, the weight element can be attached to and removed from the segment without tools.

According to a preferred embodiment, the segments are made from plastics. This allows manufacturing the segments at low costs. It is of course possible to use other materials as well.

In order to allow using corner reinforcements in the wire container, the segments form a ring, and the outer edge of the ring comprises recessed portions for accommodation of corner reinforcements of the wire container.

The invention further provides a wire container which has a reception space for a wire coil and a wire coil arranged in the reception space. The wire forms an annular end face of the wire coil from which the wire is withdrawn from the wire container. Further, a retainer for controlling the payout of wire from a wire container is provided. The retainer has at least three segments. Each segment is connected to the adjacent segment so as to allow a relative movement of adjacent segments with respect to each other. The entirety of the segments form a contact surface adapted for contacting the wire contained in the wire container.

According to an embodiment of the invention, the wire, in a direction from a free end towards the wire coil, defines a winding direction of the wire coil and the segments overlap each other such that, in the winding direction, the preceding segment extends under the succeeding segment. This features makes sure that the wire when "travelling" along the contact surface of the retainer smoothly passes from one segment to the next segment without there being a risk of being caught in a gap between adjacent segments.

BRIEF DESCRIPTION OF THE DRAWINGS

The invention will now be explained with reference to the enclosed drawings. In the drawings.

DETAILED DESCRIPTION OF THE INVENTION

FIGS. 1 to 4 show a container 10 for wire, in particular for welding wire. Container 10 comprises a side wall 12 which defines in its interior a reception space 14 for a welding wire coil 18. In the embodiment shown in the drawings, container 10 has an octagonal cross-section. In each of the corners of container 10, a corner reinforcement 20 is arranged, which can be formed from cardboard or a plastics material. The preferred material for wall 12 of container 10 also is cardboard.

Wire coil 18 is formed from a continuous wire which is laid in a plurality of turns so that a coil with a center space is formed. The central axis of the coil is arranged vertically. The wire is withdrawn from coil 18 by withdrawing the uppermost turn or layer of the coil. The portion currently withdrawn is designated in the drawings with reference numeral 22.

Figure 1:
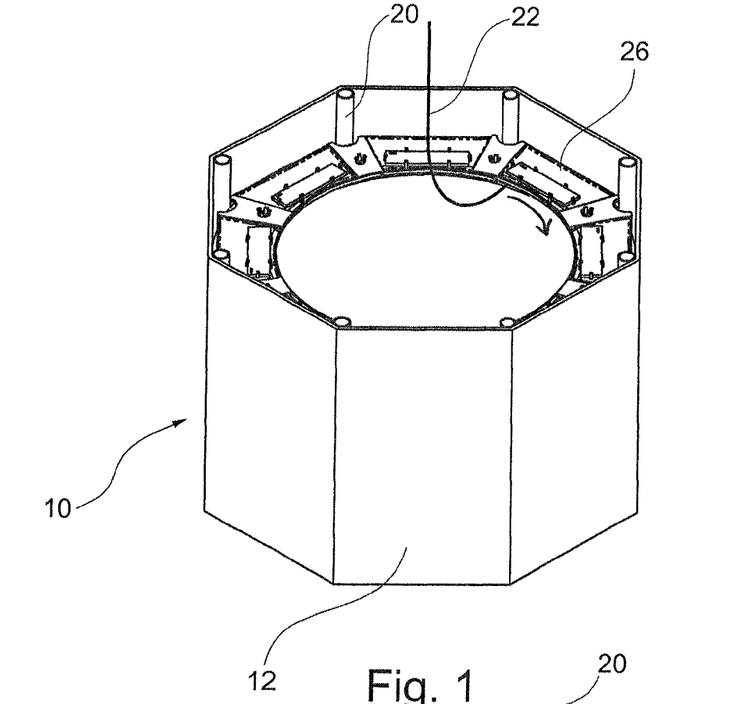
FIG. 1 shows in a perspective view a container and a retainer according to a first embodiment of the invention.
Figure 3:
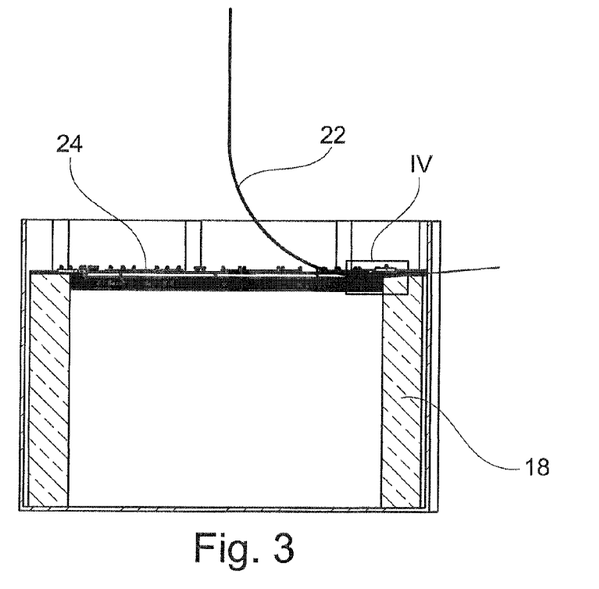
FIG. 3 shows a cross section along line of FIG. 2.
Figure 4:
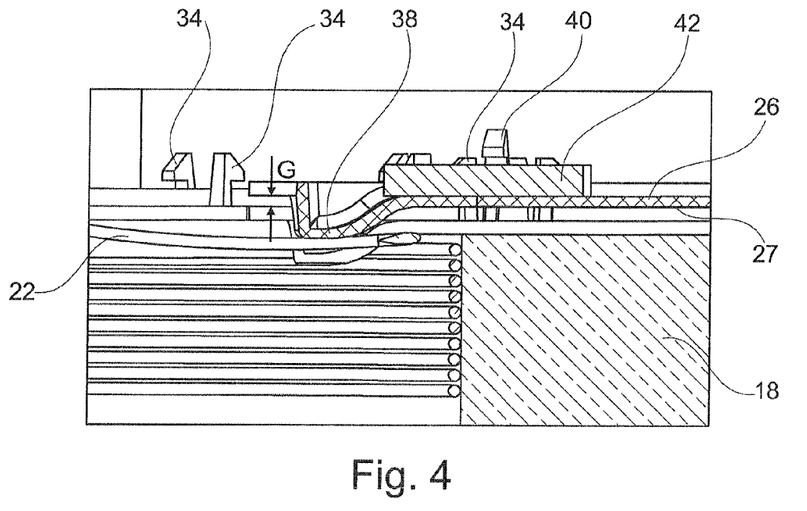
FIG. 4 shows at an enlarged scale portion IV of FIG. 3.

In order to allow smooth withdrawal of the wire from the coil in a vertical direction, the wire is wound to the coil in a pre-twisted condition. Accordingly, the wire is pretensioned when being held in the form of a coil. The pretension results in a certain tendency of the welding wire to entangle, in particular at the upper end face of the coil where the upper strands are not restrained by further strands sitting on top of them. In order to prevent unintentional entanglement, a retainer 24 is arranged on top of the wire coil. Retainer 24 rests on the upper end face of coil 18 simply by its own weight and descends downwardly towards the floor of the container when the welding wire is withdrawn from the container.

Figure 5:
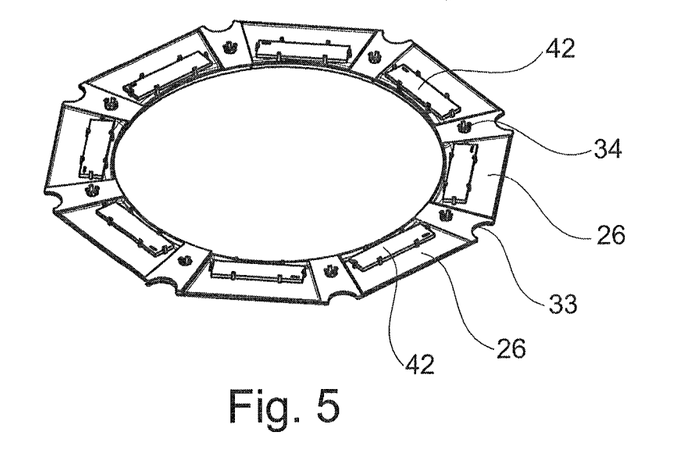
FIG. 5 shows a perspective view of the retainer used in the container of FIG. 1.
Figure 6:
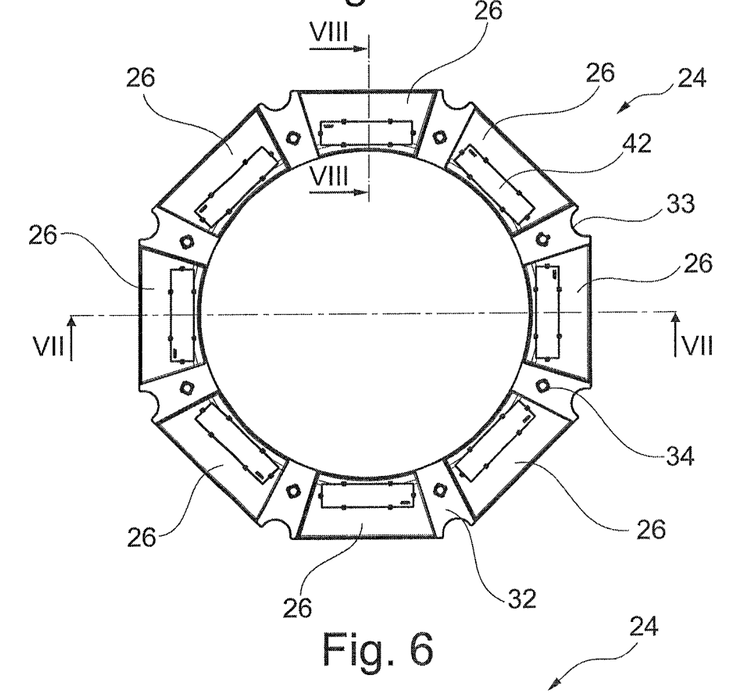
FIG. 6 shows the retainer of FIG. 5 in a top view.
Figure 7:
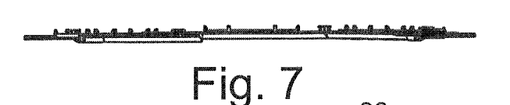
FIG. 7 shows a cross section along line VII-VII of FIG. 6.
Figure 8:
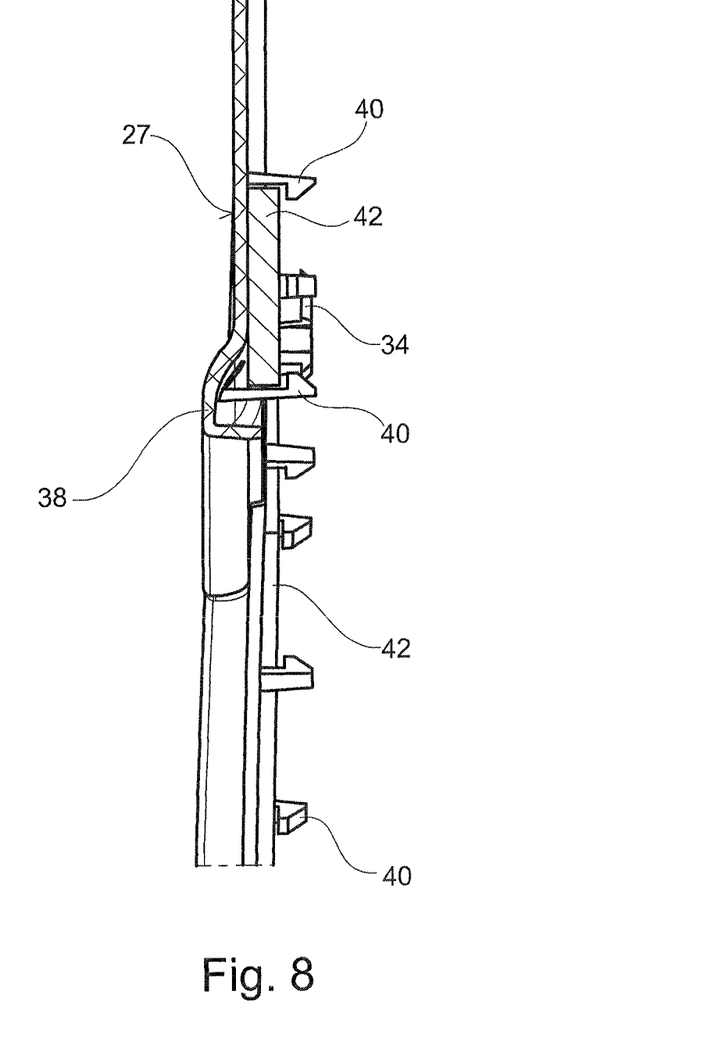
FIG. 8 shows at an enlarged scale a cross section along line VIII-VIII of FIG. 6.
Figure 9:
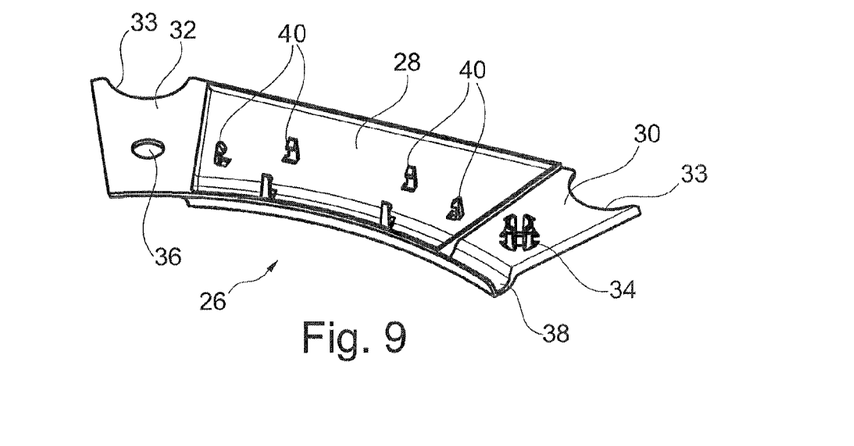
FIG. 9 shows a perspective view of one of the segments from which the retainer of FIG. 5 is formed.
Figures 10, 11, 12, 13, 14:
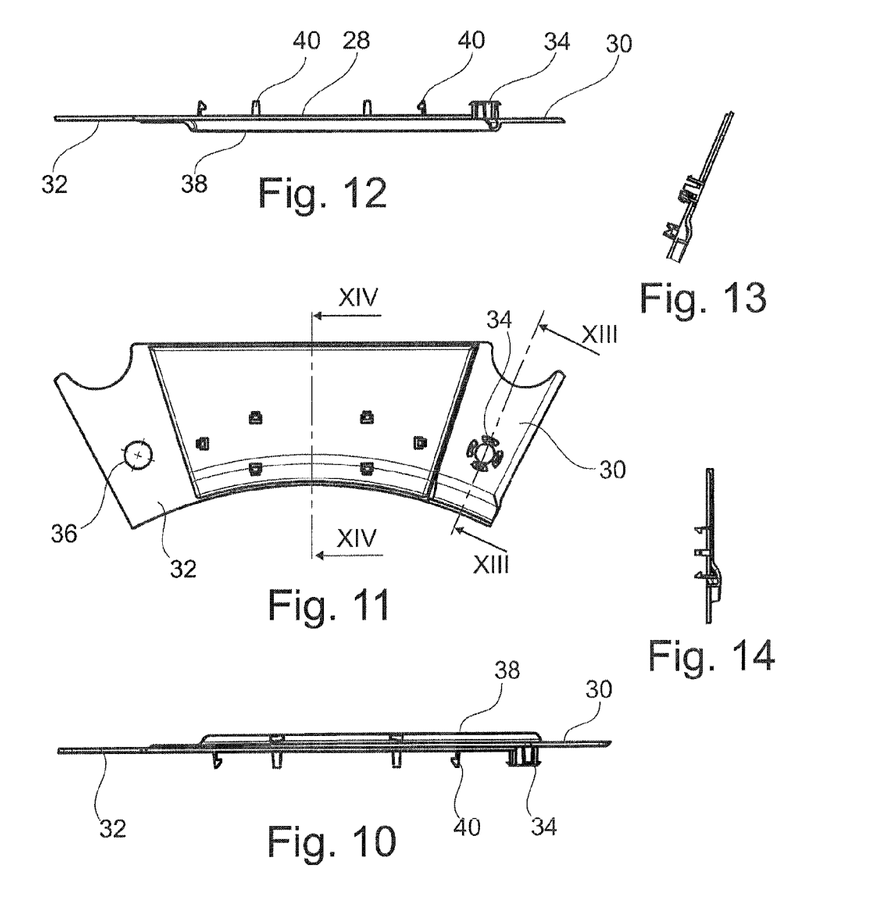
FIG. 10 shows the segment of FIG. 9 in a first side view.
FIG. 11 shows the segment of FIG. 9 in a top view.
FIG. 12 shows the segment of FIG. 9 in a second side view.
FIG. 13 shows a cross section along line XIII-XIII of FIG. 12.
FIG. 14 shows a cross section along line XIV-XIV of FIG. 12
Figure 15:
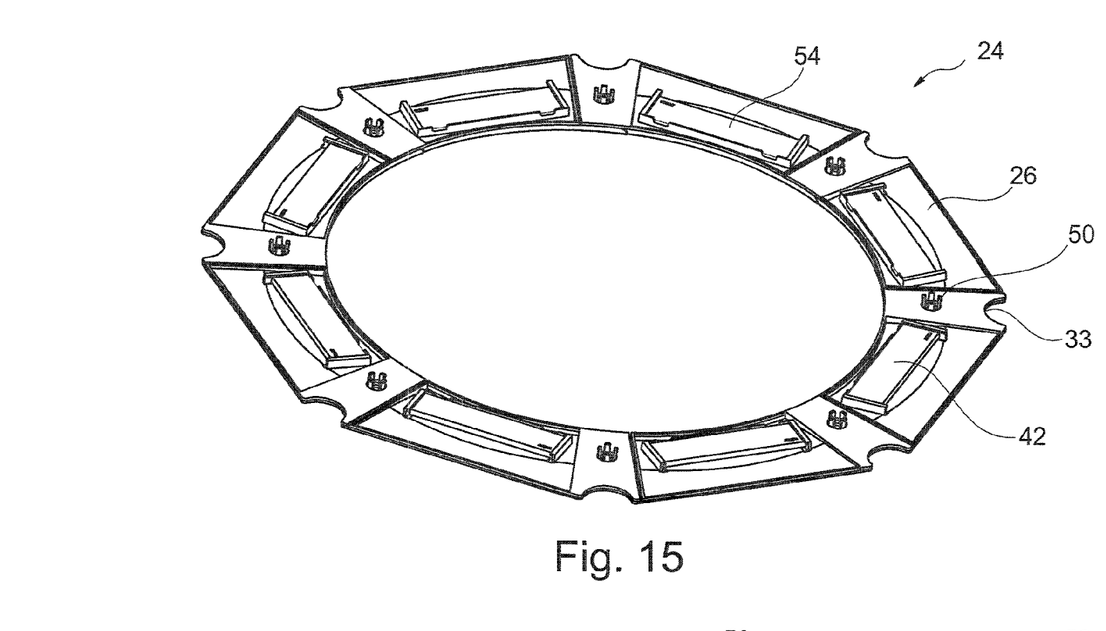
FIG. 15 shows in a perspective view a retainer according to a second embodiment.
Figure 16:
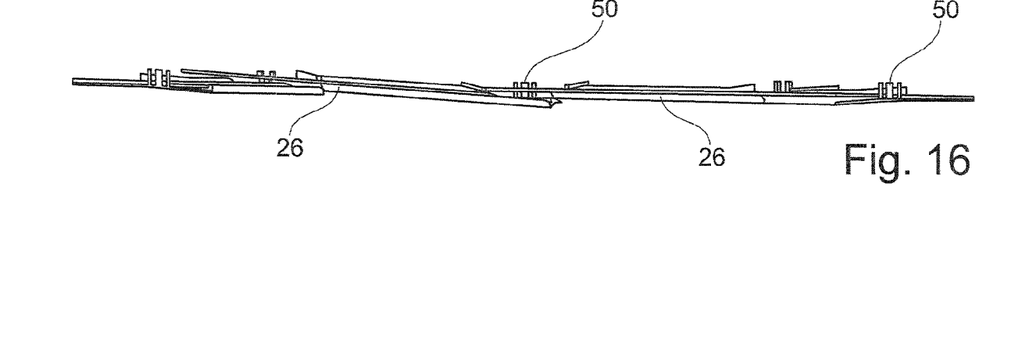
FIG. 16 shows the retainer of FIG. 15 in a side view, with some segments being tilted with respect to adjacent segments.
Figures 17, 18, 19, 20, 21, 22, 23:
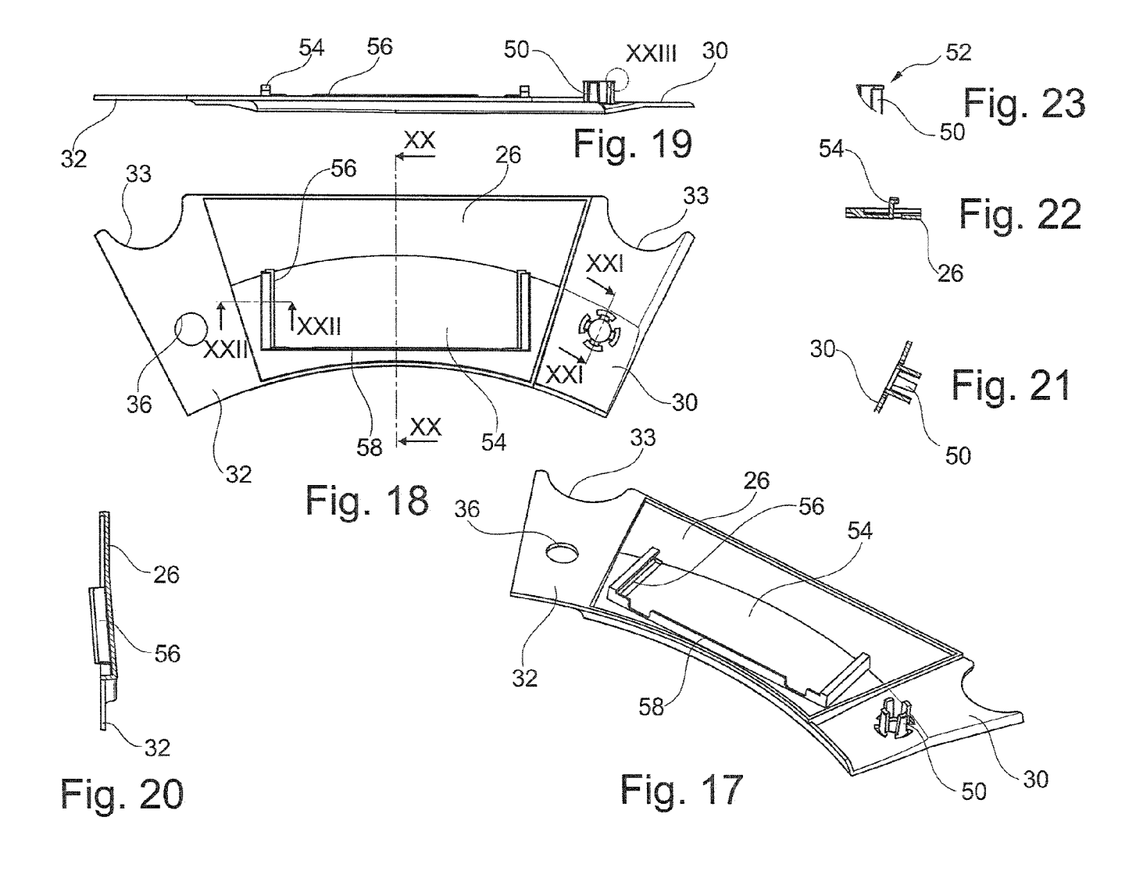
FIG. 17 shows a perspective view of one of the segments from which the retainer of FIG. 15 is formed.
FIG. 18 shows the segment of FIG. 17 in a top view.
FIG. 19 shows the segment of FIG. 18 in a side view.
FIG. 20 shows a cross section along line XX-XX of FIG. 18.
FIG. 21 shows a cross section along line XXI-XXI of FIG. 18.
FIG. 22 shows a cross section along line XXII-XXII of FIG. 18.
FIG. 23 shows a cross section along line XXIII-XXIII of FIG. 18.
Figure 24:
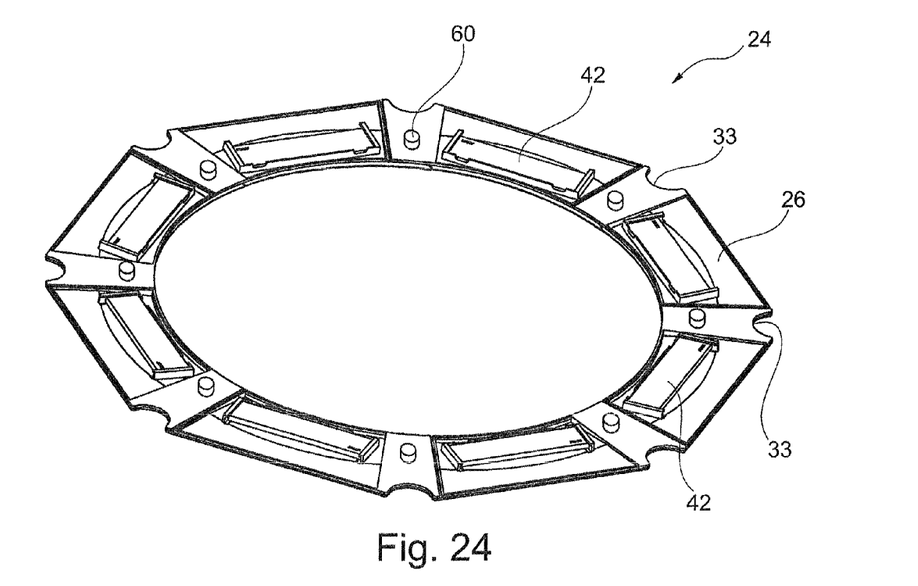
FIG. 24 shows in a perspective view a retainer according to a third embodiment.
Figure 25:
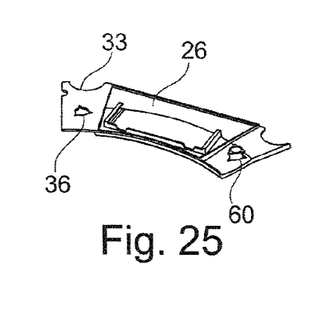
FIG. 25 shows a perspective view of one of the segments from which the retainer of FIG. 24 is formed.

Retainer 24 (please see in particular FIGS. 5 to 7) is formed from a plurality of individual segments 26 which are connected to each other so as to form retainer 24 which is ring-like. Retainer 24 has a continuous, annular contact surface 27 with which retainer 24 rests on the upper end face of coil 18.

Each segment 26 (please see in particular FIGS. 9 to 14) is a flat, tile-like element which has a center portion 28, a first connection section 30 and a second connection section 32. Connection sections 30, 32 are arranged at opposite ends of segment 26 in a peripheral direction. First connection section 30 is provided with four latches or hooks 34 which project from first connection section 30 in a direction away from contact surface 27. Second connection section 32 is provided with an opening 36, the diameter of which is adapted to a diameter defined by hooks 34. Hooks 34 and openings 36 form means for mechanically connecting or engaging adjacent segments 26 to each other. The length of hooks 34 is longer than the thickness of the second connection section 32.

Both the first connection section 30 and the second connection section 32 are provided with recessed portions 32 whose dimensions are adapted to corner reinforcements 20 of container 10.

First connection section 30 and second connection section 32 are arranged at different levels so that the different connection sections of adjacent segments 26 can be arranged in an overlapping manner while achieving a smooth, continuous contact surface 27. In other words, the upper surface of first connection section 30 (as viewed in FIGS. 9, 11 and 12) is at the same level as the lower surface of second connection section 32.

Each segment 26 comprises a shoulder 38 which defines a level which is further away from hooks 34 than contact surface 27.

The center portion 28 of each segment 26 features a fixture or accommodation for a weight element, the fixture being formed by a plurality of elastic latches 40. The fixture is adapted to receive a weight element 42 in the form of a rectangular metal plate.

Figure 2:
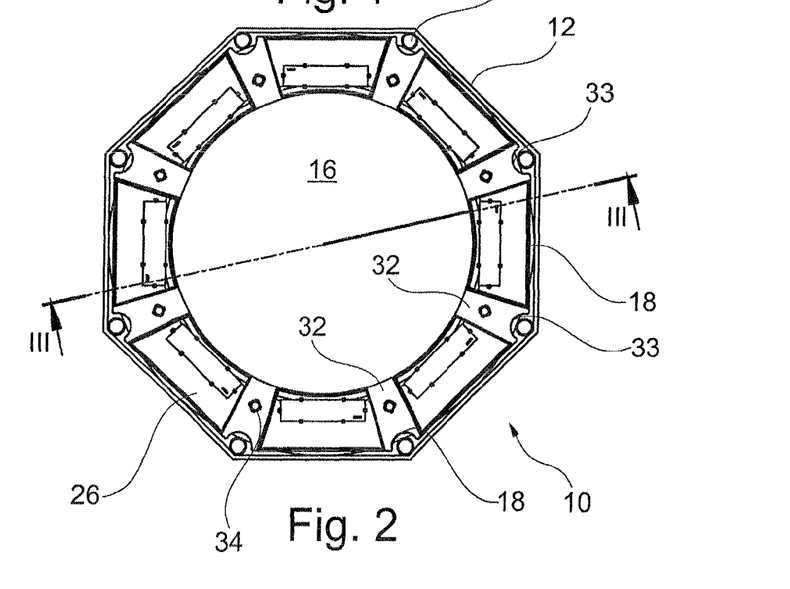
FIG. 2 shows the container of FIG. 1 in a top view.

For forming retainer 24, a plurality of segments are connected to each other by engaging hooks 34 of one segment into opening 36 of an adjacent segment. In the particular embodiment shown in the drawings, eight segments 26 are joined so that the closed ring forming the retainer is achieved. As can be seen in FIG. 2, recessed portions 33 of the segments 26 form, when connected so as to constitute retainer 24, recesses for accommodating corner reinforcements 20.

Retainer 24 is placed on the upper surface of coil 18 so that contact surface 27 of retainer 24 contacts the upper strands of the coil while shoulder 38 protrudes inwardly and downwardly into the center space of coil 18. As can be seen in FIG. 4, shoulder 38 is arranged at a radius which is smaller than the radius of the inner diameter of coil 18. Shoulder 38 being arranged at a lower level as compared to contact surface 27, retainer 24 mechanically prevents the upper strands of coil 18 from being displaced inwardly and from falling into the center space of the coil.

When welding wire is withdrawn from the container, wire portion 22 currently lifted from coil 18 "travels" in a peripheral direction along the upper face of coil 18. Since hooks 34 are larger than the wall thickness of second connection portion 32, segments 26 can be displaced with respect to each other in a direction which is perpendicular to the plane defined by retainer 24. In other words, the wire currently withdrawn from the coil is able to lift the segment which he currently contacts, while the remaining segments continue to sit flatly on the coil. Looking at FIG. 1, the left-hand side of the respective segment 26 currently contacting the wire is lifted upwardly with respect to the preceding segment 26 (please see gap G in FIG. 4) while previous segment 26 continues to sit on the upper face of wire coil 18. Assuming that wire portion 22 continues to travel in the direction of arrow A in FIG. 1, the first connection section 30 of the currently contacted segment 26 is lifted upwardly, resulting in the second connection portion 32 of the succeeding segment 26 being also lifted upwardly. As soon as the wire has passed over the first connection section 30, the then preceding segment is allowed to drop back downwardly onto the coil while the next segment is maintained with its second connection section 32 in a lifted condition. A complete turn of the wire along the upper end face of coil 18 results in all of the segments being lifted one after the other, and then returning into their original position.

Hooks 34 allow a lifting movement of one segment relative to the adjacent one which is at least equivalent to the distance with which shoulder 38 extends downwards over surface 27, so as to prevent any excessive bending of the wire currently withdrawn from the coil. The allowed upward travel of the segments ensures that the wire can be withdrawn first in a radial direction and then upwardly, rather than being first forced downwardly by shoulder 38 and then withdrawn upwardly.

Depending from the thickness and the rigidity of the wire from which coil 18 is formed, weight elements 42 with an appropriate mass can be fixed to the upper surface of each of the segments. This allows using one and the same segment in different applications with different wires.

Segments 26 are preferably formed from a plastics material so that they can be injection-molded. This results in low manufacturing costs. Further, hooks 34 and opening 36 for mechanically connecting segments 26 to each other can be formed integrally in the injection-molding process. It is of course possible to use other materials for forming the segments and to use separate components attached to the segments for connecting the segments to each other.

As an alternative to hooks 34 and openings 36, a flexible rubber strip attached to the segments could be used for forming retainer ring 24.

Contact surface 27 is preferably formed with a high surface roughness which can be easily implemented when injection-molding the segments.

The retainer described above has a couple of advantages regarding construction, storage, transport and recycling.

Each segment can be made with a smaller and therefore inexpensive mold with limited dimensions, while a one piece retainer plate of large dimensions would require a huge mold and massive equipment to produce.

The individual retainer segments can be easily transported from the supplier to assembly area, since they occupy little space and can also be shipped as replacement spare parts to end user customers in case of urgent need, allowing them to easily assemble their own retainers.

Before assembly, the segments forming the retainer can be easily stored thus avoiding the deformation which can occur with very large and relatively thin one piece retainers.

Disassembled segments after use can be easily gathered in one container and returned to the wire manufacturer for recycling, with space saving during storage and return transport.

Further, the retainer described above has a couple of advantages regarding the performance.

The relatively small weight of each individual segment, as opposed to the overall weight of the complete retainer, does not plastically deform the wire strand being paid out and this is very positive for those welding applications that require extreme accuracy and precision of weld placement. A deformed welding wire can cause "wavy" welds or can miss the "true tool point" where the weld is intended to be placed.

The segments, after the wire has passed, fall back onto the wire coil duly controlling the other strands which are not involved in the payout, and this prevents tangling and consequent unwanted production stops.

In other words, through this innovative construction and design, the retainer function is not any longer to force the payout wire to adapt itself to the retainer (a likely scenario with thinner and softer wires but absolutely impossible to achieve with large diameter and strong wires), but to have the retainer adapt itself to the wire payout by using a number of floating elements, connected together to form one retainer, that follow the wire and match its movements regardless of its "columnar" strength and size, while still effectively blocking and controlling the rest of the wire coil contained in the bulk pack.

FIGS. 15 to 23 show a retainer according to a second embodiment of the invention. For those elements known from the first embodiment, the same reference numerals will be used, and reference is made to the above explanations.

The difference between the first and the second embodiment relates to the connection between the segments, and to the accommodation of weight elements 42.

Instead of hooks 34, elastic latch tabs 50 are used which are provided with a rounded collar 52 (please see in particular FIG. 23) at their free end, which is the end facing away from the segment. Rounded collar 52 is dimensioned such that it on the one hand can be pushed through opening 36 in second connection section 32, but also allows detachment of the segments by lifting one segment relative to the adjacent segment. The holding force provided by rounded collar 52 is such that during normal operation of the retainer, the segments are reliably held together, while a worker seeking to disassemble the retainer can overcome the holding force without using tools and without damaging the segments.

For holding the weight elements, the retainer according to the second embodiment is provided with a fixture 54 which is formed from two rail-like elements 56 arranged parallel to each other, and an abutment 58. The dimensions of rail-like elements 56 are chosen such that weight elements 42 are held by frictional forces.

In FIGS. 24 to 31, a retainer according to a third embodiment is shown. For the elements known from the previous embodiments, the same reference numerals will be used, and reference is made to the above comments.

The difference between the second and the third embodiment relates to the connection between adjacent segments 26. In the third embodiment, a mechanical locking system is used which allows connecting the segments when they are in a particular orientation with respect to each other, and mechanically locking the segments to each other when the segments assume a position with respect to each other which is different from the particular orientation which allows connecting them.

Figure 26:
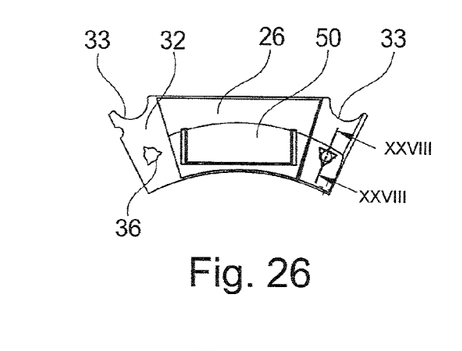
FIG. 26 shows the segment of FIG. 25 in a top view.
Figure 27:
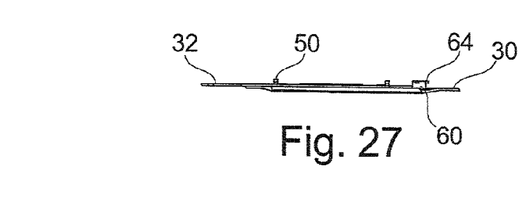
FIG. 27 shows the segment of FIG. 25 in a side view.
Figure 28:
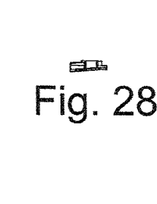
FIG. 28 shows a cross section along line XXVIII-XXVIII of FIG. 26.
Figure 29:
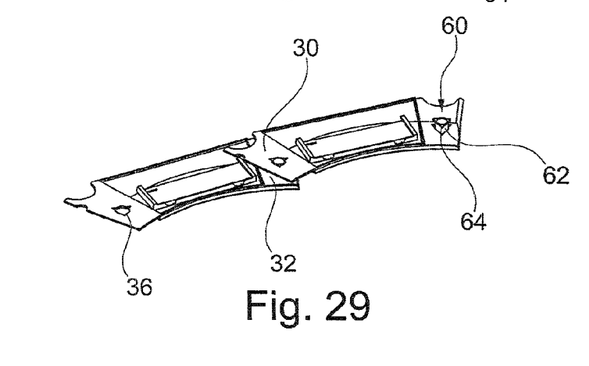
FIG. 29 shows in a perspective view two of the segments of the retainer of FIG. 24 when being joined to each other.
Figure 30:
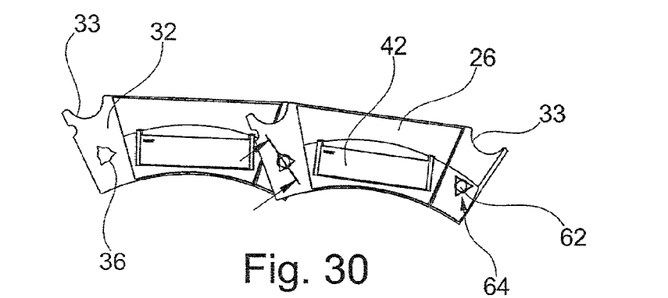
FIG. 30 shows the segment of FIG. 29 in a top view.
Figure 31:
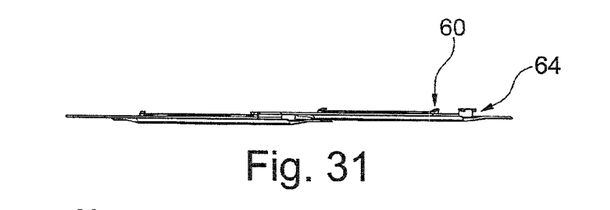
FIG. 31 shows the segment of FIG. 29 in a side view, and FIG. 32 schematically shows a connection between two segments of a retainer according to a fourth embodiment of the invention.

As can be seen in particular in FIGS. 26 and 30, opening 36 has a circular base shape with three triangular recesses which extend outwardly beyond the base shape. At first connection section 30, a complementary connection element 60 is used which consists of a cylindrical sleeve 62 having a diameter which corresponds to the diameter of the circular base shape, and an end plate which is provided with three projecting triangles 64. As can be seen in particular in FIG. 30, two adjacent segments can be mechanically connected to each other when they are in a connecting position in which the triangles 64 fit through the triangular recesses of opening 36. The position in which the segments can be connected to each other is different from the orientation which the segments assume when being used as part of retainer 24. In particular, the segments are oriented approximately in a straight line (please see in particular FIG. 30) so that after mounting, the segments are displaced by approximately 45° with respect to each other. This results in triangles 64 being rotated with respect to triangular recesses of opening 36 so that adjacent segments 26 are prevented from being disconnected from each other. At the same time, a lifting movement between adjacent segments is possible as opening 36 can slide in an axial direction on sleeve 62.

Instead of the particular design with triangles 64 and triangular recesses in opening 36, other designs are possible which feature a retaining element which is non-circular. It is simply necessary that the mounting of the segments is possible in one orientation of the segments with respect to each other while a locking effect is achieved when the segments are in the position with respect to each other which they assume when forming the ring-like retainer.

Figure 32:
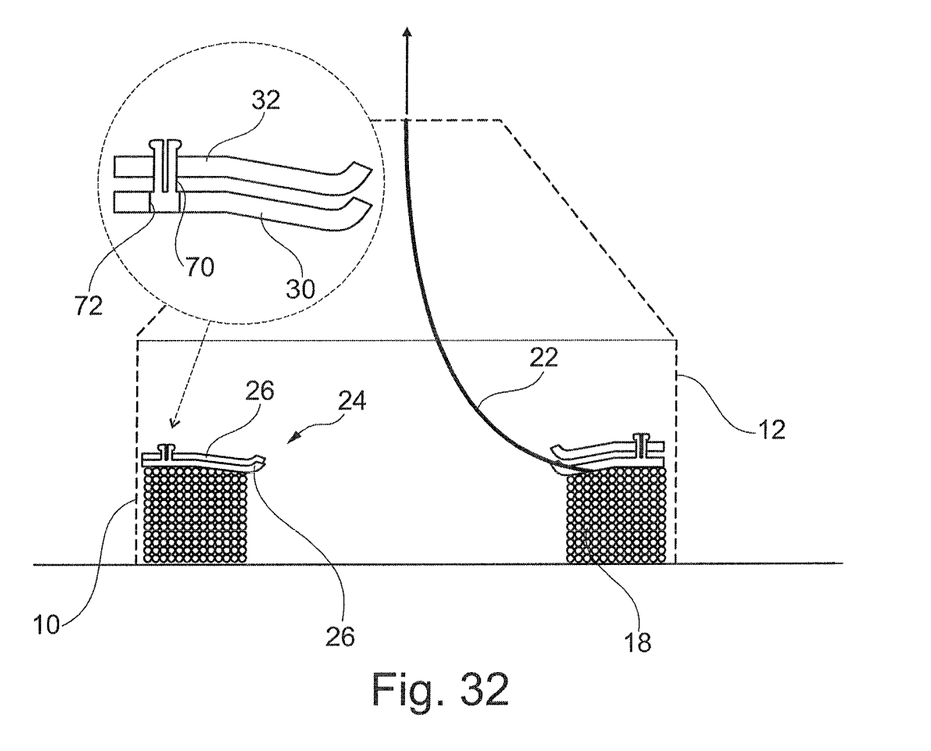

FIG. 32 shows a fourth embodiment of the invention. The difference between the fourth embodiment and the previous embodiment relates to the connection between adjacent segments. In the embodiment of FIG. 32, a pin-like holding element 70 is used which extends through opening 36 in the second connection section 32 of one segment, and engages into a holding opening 72 in the first connection section 30 of the adjacent segment. Holding element 70 and holding opening 72 are configured such that holding element 70 can be inserted in a manner similar to a nail for connecting adjacent segments to each other, but can be withdrawn from holding opening 72 when exerting a force which is higher than the forces occurring during normal operation of the retainer. This allows to disassemble the retainer after use.

The invention claimed is:

1. A retainer for controlling the payout of wire from a wire container, the retainer having at least three segments, each segment being connected to the adjacent segment so as to allow a relative movement of adjacent segments with respect to each other, the entirety of the segments forming a contact surface adapted for contacting the wire contained in the wire container, wherein the segments overlap each other, and
wherein each segment comprises a first connection section and a second connection section arranged at opposite ends of each segment, the first connection section of one of the segments being connected to the second connection section of an adjacent segment, the first connection section being part of the contact surface and the second connection section being arranged on top of the first connection section, and wherein the first connection section comprises a projection and the second connection section comprises a through-hole opening into which the projection engages.

2. The retainer of claim 1 wherein the segments are identical.

3. The retainer of claim 1 wherein each segment comprises a first connection section and a second connection section, the first and second connection sections being arranged at opposite ends of the segment, the first connection section of one of the segments being connected to the second connection section of an adjacent one of the segments.

4. The retainer of claim 3 wherein the first connection section and the second connection section mechanically engage into each other.

5. The retainer of claim 1 wherein the projection comprises at least one releasable attachment latch.

6. The retainer of claim 1 wherein the projection comprises at least one elastic tab.

7. The retainer of claim 6 wherein the elastic tab comprises a rounded collar at a free end thereof.

8. The retainer of claim 1 wherein the projection comprises a sleeve and an end plate which is non-circular.

9. The retainer of claim 8 wherein the end plate comprises elements which project in a radial direction with respect to a central axis of the sleeve.

10. The retainer of claim 9 wherein the elements are triangular.

11. The retainer of claim 9 wherein three elements are provided which are arranged at equal intervals.

12. The retainer of claim 1 wherein the projection is a holding element which is releasably connected to the first connection section.

13. The retainer of claim 1 wherein the segments form a ring, the inner circumference of the ring comprising a shoulder which is arranged at a level which is different from a level defined by the contact surface.

14. The retainer of claim 1 wherein the contact surface comprises roughened portions.

15. The retainer of claim 1 wherein at least one of the segments is provided with a separate weight element.

16. The retainer of claim 15 wherein the separate weight element is formed from metal.

17. The retainer of claim 15 wherein the separate weight element is mechanically connected to the segment.

18. The retainer of claim 17 wherein the segment comprises a fixture for the separate weight element.

19. The retainer of claim 18 wherein the fixture comprises at least one elastic latch for releasably attaching the separate weight element to the segment.

20. The retainer of claim 1 wherein the segments are made from plastics.

21. The retainer of claim 1 wherein the segments form a ring, the outer edge of the ring comprising recessed portions for accommodation of corner reinforcements of the wire container.

22. A wire container having a reception space for a wire coil, a wire coil arranged in the reception space, with the wire forming an annular end face of the wire coil from which the wire is withdrawn from the wire container, and a retainer for controlling the payout of wire from a wire container, the retainer having at least three segments, each segment being connected to the adjacent segment so as to allow a relative movement of adjacent segments with respect to each other, the entirety of the segments forming a contact surface adapted for contacting the wire contained in the wire container, wherein the segments overlap each other, and wherein each segment comprises a first connection section and a second connection section arranged at opposite ends of each segment, the first connection section of one of the segments being connected to the second connection section of an adjacent segment, the first connection section being part of the contact surface and the second connection section being arranged on top of the first connection section, and wherein the first connection section comprises a projection and the second connection section comprises a through-hole opening into which the projection engages.

23. The wire container of claim 22 wherein the wire, in a direction from a free end towards the wire coil, defines a winding direction of the wire coil and the segments overlap each other such that, in the winding direction, the preceding segment extends under the succeeding segment.

* * * * *

UNITED STATES PATENT AND TRADEMARK OFFICE
CERTIFICATE OF CORRECTION

| | | |
|---|---|---|
| PATENT NO. | : 8,882,018 B2 | Page 1 of 1 |
| APPLICATION NO. | : 13/330314 | |
| DATED | : November 11, 2014 | |
| INVENTOR(S) | : Carlo Gelmetti | |

It is certified that error appears in the above-identified patent and that said Letters Patent is hereby corrected as shown below:

On the Title Page

Page 3, (56), References Cited, Col. 2, FOREIGN PATENT DOCUMENTS, line 15, "10292831" should be --10202839--.

Page 3, (56), References Cited, Col. 2, FOREIGN PATENT DOCUMENTS, line 61, "59-732669" should be --59-232669--.

Signed and Sealed this
Seventh Day of April, 2015

Michelle K. Lee
*Director of the United States Patent and Trademark Office*